United States Patent
Bae et al.

(10) Patent No.: US 8,042,231 B2
(45) Date of Patent: Oct. 25, 2011

(54) PORTABLE TERMINAL WITH HINGE APPARATUS

(75) Inventors: Dong-Won Bae, Daegu (KR); Do-Hun Kim, Seoul (KR); Hyon-Myong Song, Daegu (KR); Eon-Seog Cheon, Daegu (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 7 days.

(21) Appl. No.: 11/850,794

(22) Filed: Sep. 6, 2007

(65) Prior Publication Data

US 2008/0204985 A1 Aug. 28, 2008

(30) Foreign Application Priority Data

Feb. 22, 2007 (KR) .................. 10-2007-0017942

(51) Int. Cl.
*E05D 3/10* (2006.01)
(52) U.S. Cl. .................. 16/367; 361/679.07; 379/433.13
(58) Field of Classification Search .................... 16/367, 16/330, 329, 325, 331, 332; 455/575.1, 575.3; 379/433.13; 361/679.07
See application file for complete search history.

(56) References Cited

U.S. PATENT DOCUMENTS

| | | | | |
|---|---|---|---|---|
| 6,658,272 B1 * | 12/2003 | Lenchik et al. | ............ | 455/575.1 |
| 6,839,576 B2 * | 1/2005 | Aagaard et al. | ............ | 455/575.1 |
| 7,003,318 B2 * | 2/2006 | Kota et al. | ............ | 455/556.1 |
| 7,165,291 B2 * | 1/2007 | Gan | ............ | 16/367 |
| 7,168,136 B2 * | 1/2007 | Gan | ............ | 16/367 |
| 7,280,854 B2 * | 10/2007 | Sugawara et al. | ............ | 455/575.1 |
| 7,406,343 B2 * | 7/2008 | Hung | ............ | 455/575.3 |
| 7,619,686 B2 * | 11/2009 | Tom | ............ | 348/376 |
| 7,657,027 B2 * | 2/2010 | Kim et al. | ............ | 379/433.13 |
| 7,669,289 B2 * | 3/2010 | Shih et al. | ............ | 16/367 |
| 2003/0159244 A1 * | 8/2003 | Sparkman | ............ | 16/86 C |
| 2006/0185123 A1 * | 8/2006 | Kuramochi | ............ | 16/221 |
| 2008/0199002 A1 * | 8/2008 | Kim et al. | ............ | 379/433.13 |

FOREIGN PATENT DOCUMENTS

| | | | |
|---|---|---|---|
| KR | 1020060019648 A | | 3/2006 |
| KR | 10-2006-0092498 A | | 8/2006 |
| KR | 10-2007-0099340 A | | 10/2007 |
| WO | 2005099234 A1 | | 10/2005 |

* cited by examiner

*Primary Examiner* — Victor Batson
*Assistant Examiner* — Matthew Sullivan
(74) *Attorney, Agent, or Firm* — Jefferson IP Law, LLP

(57) ABSTRACT

A portable terminal having a hinge apparatus is provided. The portable terminal includes a first housing, a second housing pivotally coupled to the first housing so that the second housing can be unfolded from and folded onto the first housing, and a hinge apparatus coupling the first housing and the second housing together. The hinge apparatus provides a first hinge axis and a second hinge axis perpendicular to each other, in which, from the folded state in which the second housing is folded on the first housing, the second housing is operable to rotate about the first hinge axis to be located in an upper side of the first housing and to rotate about the second hinge axis to be located in a first side of the first housing. Also, the hinge apparatus allows the second housing to rotate about the first hinge axis to be unfolded at an angle of approximately 90° with respect to the first housing and then rotate about the second hinge axis so that an inner face of the second housing is oriented in a same direction in which a first side of the portable terminal faces. Therefore, the hinge apparatus provides a portable terminal that is convenient to use not only communication functions, but also multimedia services such as watching broadcastings.

19 Claims, 12 Drawing Sheets

PORTABLE TERMINAL WITH HINGE APPARATUS

PRIORITY

This application claims the benefit under 35 U.S.C. § 119(a) of a Korean patent application filed with the Korean Intellectual Property Office on Feb. 22, 2007 and assigned Ser. No. 2007-17942, the entire disclosure of which is hereby incorporated by reference.

BACKGROUND OF THE INVENTION

1. Field of the Invention

The present invention relates to a portable terminal. More particularly, the present invention relates to a portable terminal with a hinge apparatus in which the hinge apparatus pivotally couples a pair of housings to each other and provides two hinge axes that are different from each other, whereby the hinge apparatus can provide unfolded states having different appearances according to operation modes.

2. Description of the Related Art

In general, portable terminals may be classified as a bar-type terminal, a flip-type terminal and a folder-type terminal according to the appearance of the terminal.

The bar-type terminal has a single body housing on which data input/output units and transmitter/receiver units are arranged. With such an arrangement, the data input unit of this terminal, such as its keypad, is always exposed and is thereby likely to be operated erroneously. In addition, because a sufficient distance between the transmitter unit and receiver unit must be maintained, there is a limitation in how small the bar-type terminal can be made.

The flip-type terminal has a body, a flip and a hinge module coupling the body and the flip to each other. In the flip-type terminal, the body has data input/output units and transmitter/receiver units arranged thereon and the flip covers the keypad used as the data input units, thereby preventing erroneous operation. However, this terminal is also subject to a limitation for compact size because the distance between the transmitter unit and receiver unit must be maintained as well.

The folder-type terminal has a body, a folder, and a hinge module pivotally coupling the body and the folder to each other. The folder-type terminal is opened and closed by rotating the folder, thereby preventing the erroneous operation of the keypad in standby mode in which the folder is folded onto the body. Also, the folder is unfolded in the calling mode so as to provide a sufficient distance between the transmitter unit and receiver unit. Thus, the folder-type terminal has an advantage in its ability to be made compact. For this reason, the folder-type terminal has become very popular among the different types of portable terminals.

Meanwhile, in order to meet various user preferences, sliding-type terminals and swing-type terminals have appeared. In particular, the sliding-type terminals are becoming a more common type than the folder-type terminals.

However, since conventional portable terminals have developed to have an appearance suitable for a communication function such as voice call, text message transmission, etc., they are inconvenient for multimedia services. For example, since the conventional portable terminals have a display device typically set to be longer in the vertical direction, it is inconvenient for the user to watch digital multimedia broadcasting (DMB), motion picture files, etc. with them.

SUMMARY OF THE INVENTION

An aspect of the present invention is to address at least the above-mentioned problems and/or disadvantages occurring in the prior art and to provide at least the advantages described below. Accordingly, an aspect of the present invention is to provide a portable terminal with a hinge apparatus which makes it convenient to use the portable terminal for not only communication functions, but also multimedia services such as watching broadcastings.

Another aspect of the present invention is to provide a portable terminal with a hinge apparatus having two axes that provide a first hinge axis and a second hinge axis so that a housing can be opened and closed in two directions, and thus improve convenience of use.

A further aspect of the present invention is to provide a portable terminal with a hinge apparatus which makes it convenient to take a picture if the portable terminal has a camera lens mounted thereon.

In accordance with an aspect of the present invention, a portable terminal is provided. The portable terminal includes a first housing, a second housing pivotally coupled to the first housing so that the second housing can be unfolded from and folded onto the first housing, and a hinge apparatus coupling the first housing and the second housing together and providing a first hinge axis and a second hinge axis perpendicular to each other, in which, from the folded state in which the second housing is folded on the first housing, the second housing is operable to rotate about the first hinge axis to be located in an upper side of the first housing, is operable to rotate about the second hinge axis to be located in a first side of the first housing, and is operable to rotate about the first hinge axis to be unfolded at an angle of approximately 90° with respect to the first housing and then rotate about the second hinge axis so that an inner face of the second housing is oriented in a same direction in which a first side of the portable terminal faces.

In accordance with another aspect of the present invention, a portable terminal is provided. A first housing and a second housing of the portable terminal are pivotally coupled to each other, in which the second housing selectively rotates about either the first hinge axis or second hinge axis and then is unfolded from a folded state on the first housing.

In accordance with yet another aspect of the present invention, a hinge apparatus is provided. The hinge apparatus, by which the first and second housing are pivotally coupled to each other, has the first hinge shaft and the second hinge shaft. The first hinge shaft is coupled to the first housing along the first hinge axis and the second hinge shaft is coupled to the second housing along the second hinge axis. The second hinge shaft rotates about either the first hinge shaft or the second hinge axis, thereby enabling the second housing to rotate about either the first hinge shaft or the second hinge axis.

In accordance with still another aspect of the present invention, the first hinge shaft has a first and second stopper slots and the second hinge shaft has a first stopper rib, so that once the second housing has rotated about one of the first hinge axis and second hinge axis and the second housing is restricted from rotating about the other hinge axis. In accordance with this aspect of the invention, the second housing can rotate about one of the first hinge axis and the second hinge axis only when folded on the first housing. That is, when rotating about one of the first hinge axis and second hinge axis to be away from the first housing, the second housing cannot rotate about the other hinge axis.

However, when the second housing has rotated about the first hinge axis to be unfolded at the angle of approximately 90°, it can rotate about the second hinge axis so that the inner face of the second housing is oriented in a same direction in which a first side of the portable terminal faces. The second housing is restricted from rotating about the first hinge axis when the inner face of the second housing is oriented in a same direction in which a first side of the portable terminal faces.

BRIEF DESCRIPTION OF THE DRAWINGS

The above and other exemplary features, aspects, and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
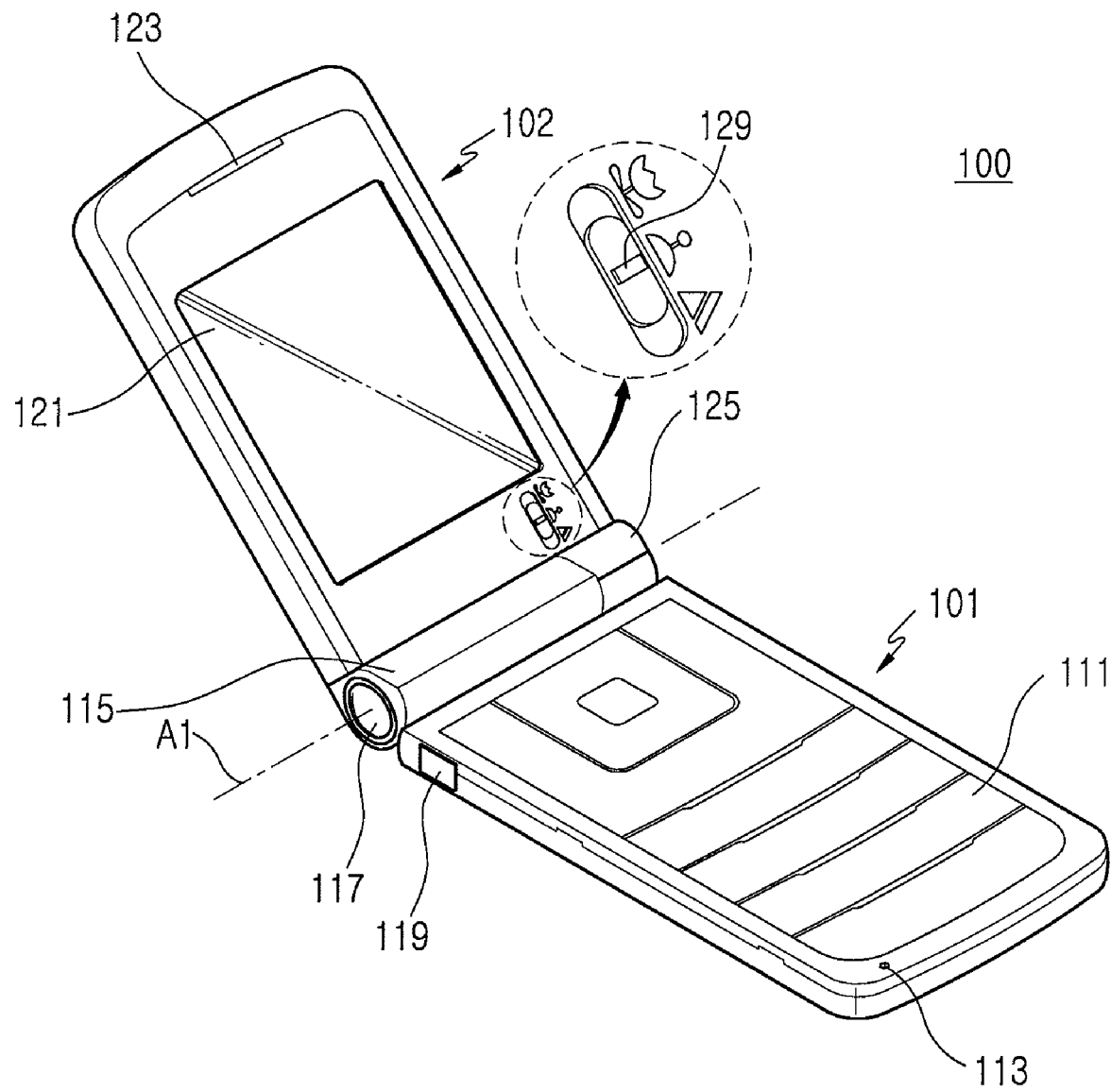
FIG. 1 is a perspective view illustrating a portable terminal with a hinge apparatus according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

As illustrated in FIGS. 1 to 5, a portable terminal 100 with a hinge apparatus 200 (illustrated in FIG. 6) according to an exemplary embodiment includes a first housing 101 and a second housing 102, in which the second housing 102 can rotate about either a first hinge axis A1 or a second hinge axis A2 perpendicular to each other.

The second housing 102 can optionally rotate about one of the first hinge axis A1 and second hinge axis A2 only when it is folded on the first housing 101. Once the second housing 102 has rotated about one of the first hinge axis A1 and second hinge axis A2 and has moved away from the first housing 101, the second housing 102 cannot rotate about the other hinge axis. This will be explained in greater detail below through a construction of the hinge apparatus 200. In addition, when the second housing 102 has rotated about the first hinge axis A1 and therefore has been unfolded at an angle of approximately 90° with respect to the first housing 101, the second housing 102 can rotate about the second hinge axis A2 so as to allow its inner face to be oriented in a same direction in which a first side of the portable terminal 100 faces.

That is, the second housing 102 can optionally rotate about one of the first hinge axis A1 and second hinge axis A2 only when the second housing 102 is folded on the first housing 101 and is unfolded at an angle of approximately 90° with respect to the first housing 101 through rotation about the first hinge axis A1. Assuming that a direction in which the second housing 102 rotates about the second hinge axis A2 from a folded state on the first housing 101 is a first direction, a direction, in which the second housing 102 rotates about the second hinge axis A2 from an unfolded state that the second housing 102 is unfolded at the angle of approximately 90° with respect to the first housing 101 due to rotation of the second housing 102 about the first hinge axis A1 is a reverse direction of the first direction.

The first housing 101 includes a main body for receiving a main board, a battery pack, etc. The first housing 101 has a keypad 111 and a transmitter unit 113 arranged on its inner face, which are opened and closed by the second housing 102. The first housing 101 has a zoom button 117a and a shutter switch 117b which are arranged on a first side face thereof. The first housing 101 has a camera lens 117 and a lighting device 119 which are arranged on a second side face thereof. As described below, the camera lens 117 is located on the first hinge axis A1 and the lighting device 119 is located adjacent to the camera lens 117. Also, the first housing 101 has a volume control key 117c on the second side face thereof.

Although, in the exemplary embodiment of the present invention, the zoom button 117a and the shutter switch 117b are arranged on the first side face of the first housing 101 and the volume control key 117c is arranged on the second side face of the first housing 101, positions on which the zoom button 117a, shutter switch 117b and volume control key 117c are arranged can be variously modified according to suit various products.

In order to be coupled with the second housing 102, the first housing 101 has a first hinge arm 115 on an upper end portion thereof, which extends along the first hinge axis A1. The first hinge arm 115 is formed on only the portion which corresponds to a part of the entire width of the first housing 101, thereby providing a place which corresponds to the rest of the width of the first housing 101, at which a second hinge arm 125 is arranged as described below. Here, the camera lens 117 is mounted on the second end of the first hinge arm 115 and then located on the first hinge axis A1.

The second housing 102 has a display device 121 and a receiver unit 123, which are disposed on an inner face thereof. The second housing 102 has the second hinge arm 125 coupled to one end thereof. Also, the second housing 102 has, on its inner face, a photographic mode selection switch 129 arranged adjacent to the display device 121. When taking a photograph of a subject with the camera lens 117, the user can select one of several different photographic modes such as a macro mode, a portrait mode, a landscape mode and the like and can take the photograph in the selected photographic mode.

In an assembled state, the one end of the second hinge arm 125 is in contact with one end of the first hinge arm 115, and the second hinge arm 125 can rotate about the first hinge axis A1. Therefore, the second housing 102 can also rotate about the first hinge axis A1 together with the second hinge arm 125. In addition, in a connection of the second housing 102 with the second hinge arm 125, the second housing 102 is rotatably coupled with the second hinge arm 125 so that it can rotate about the second hinge axis A2. Accordingly, in a folded state in which the second housing 102 is folded on the first housing 101, the second housing 102 can rotate either about the first hinge axis A1 together with the second hinge arm 125 or about the second hinge axis A2 relative to the second hinge arm 125.

Figure 3:
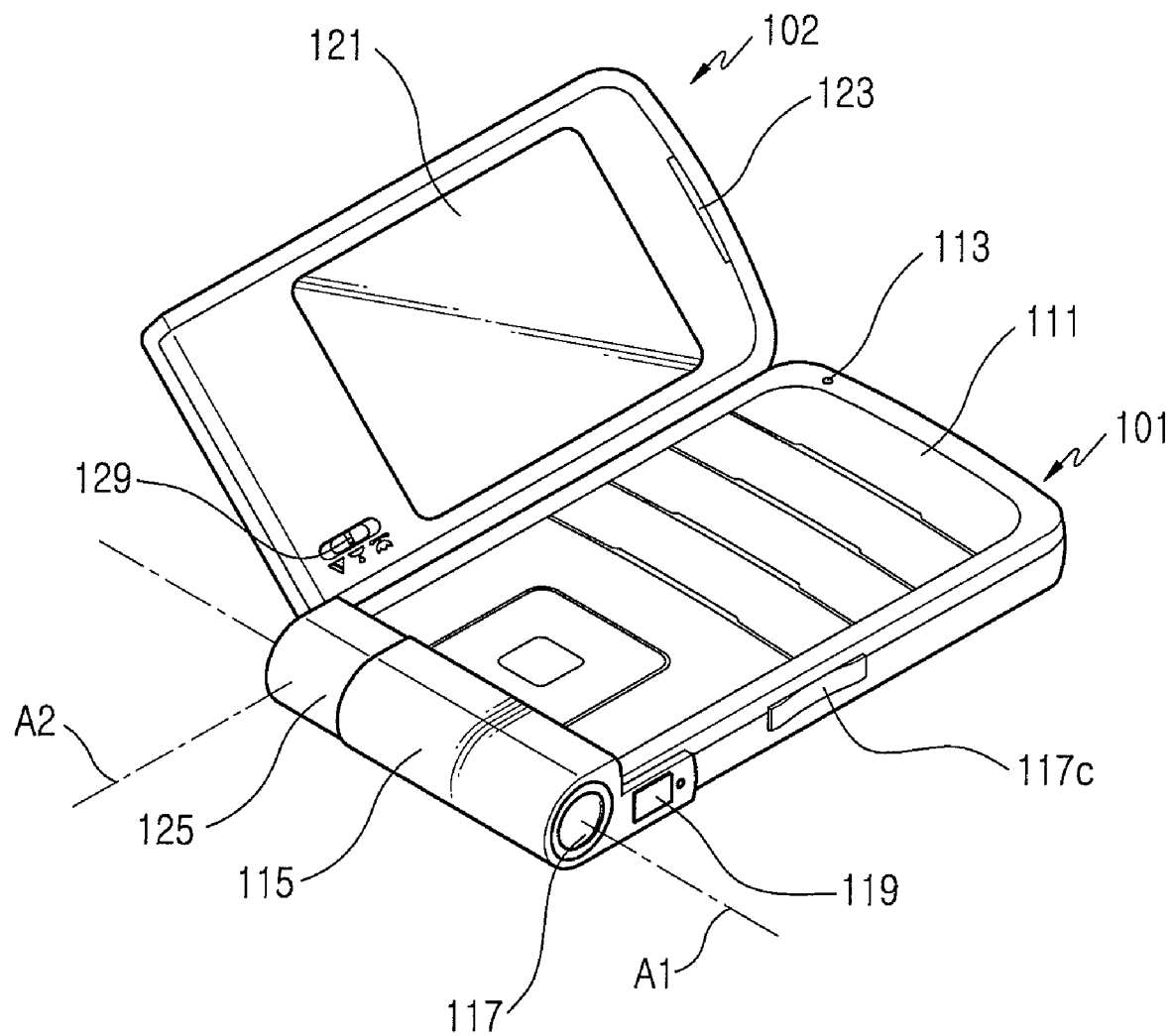
FIG. 3 is a perspective view illustrating a portable terminal of FIG. 1 in an unfolded state, in which a second housing of the portable terminal rotates about a second hinge axis to be unfolded.

FIG. 1 illustrates an unfolded state in which the second housing 102 has rotated about the first hinge axis A1. FIG. 3 illustrates another unfolded state in which the second housing 102 has rotated about the second hinge axis A2.

Referring to FIG. 1, the second housing 102 may rotate about the first hinge axis A1. In this unfolded state, the portable terminal 100 has the same appearance as that of a common folder-type terminal. Thus, in this unfolded state, in which the second housing 102 has rotated about the first hinge axis A1, the user can conveniently use the portable terminal 100 for normal mobile communication functions, for playing games and the like.

Referring to FIG. 3, the second housing 102 has rotated about the second hinge axis A2 to be in another unfolded state. In this unfolded state, the portable terminal 100 can provide a laterally long screen in appearance. Thus, when the second housing 102 has rotated about the second hinge axis A2 and therefore is in another unfolded state, the user can conveniently use the portable terminal 100 for multimedia services such as watching broadcasts etc.

Figure 4:
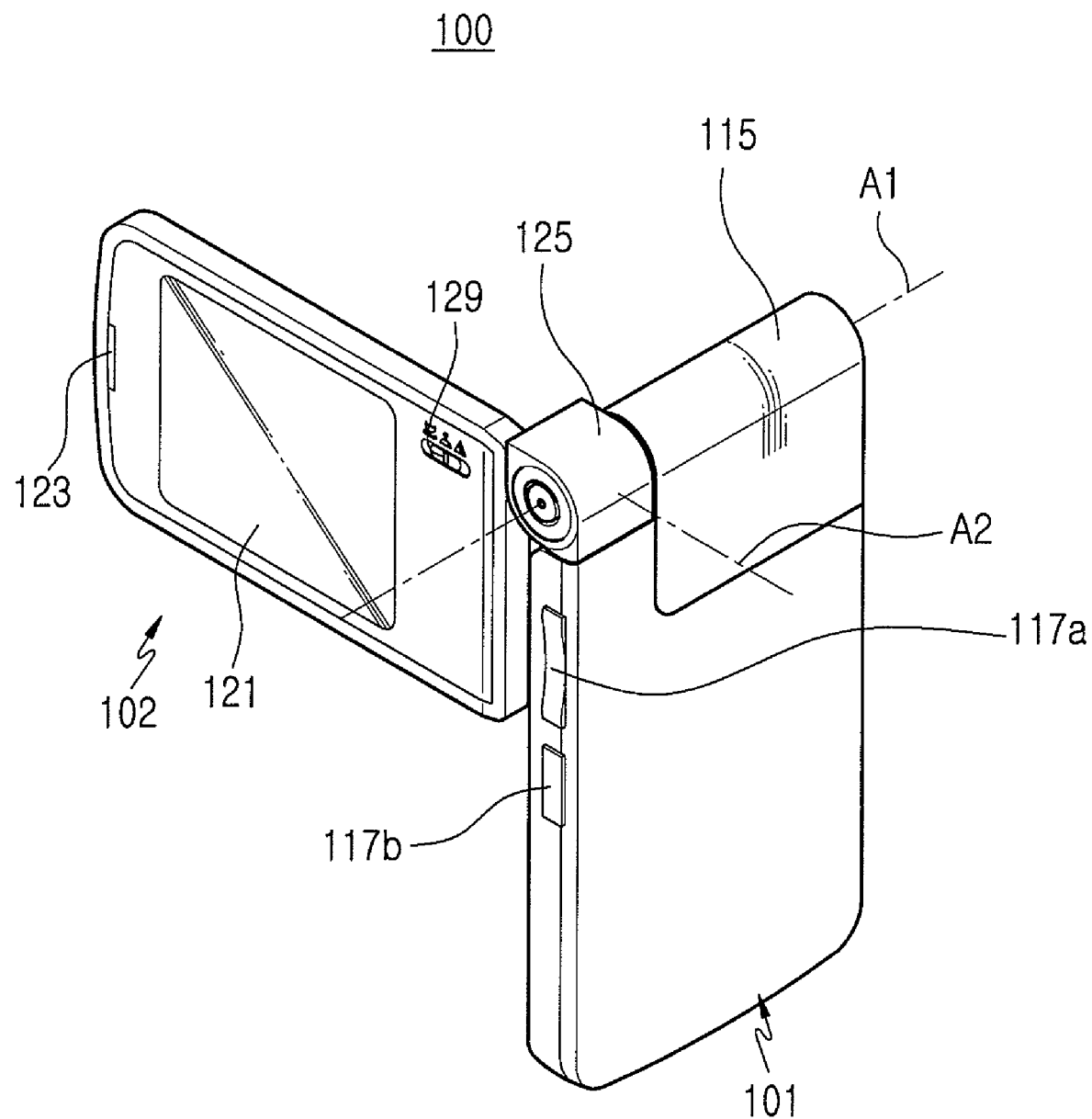
FIG. 4 is a perspective view illustrating a portable terminal of FIG. 1 in an unfolded state, in which a second housing rotates about a first hinge axis and a second hinge axis sequentially, each at an angle of approximately 90°.
Figure 5:
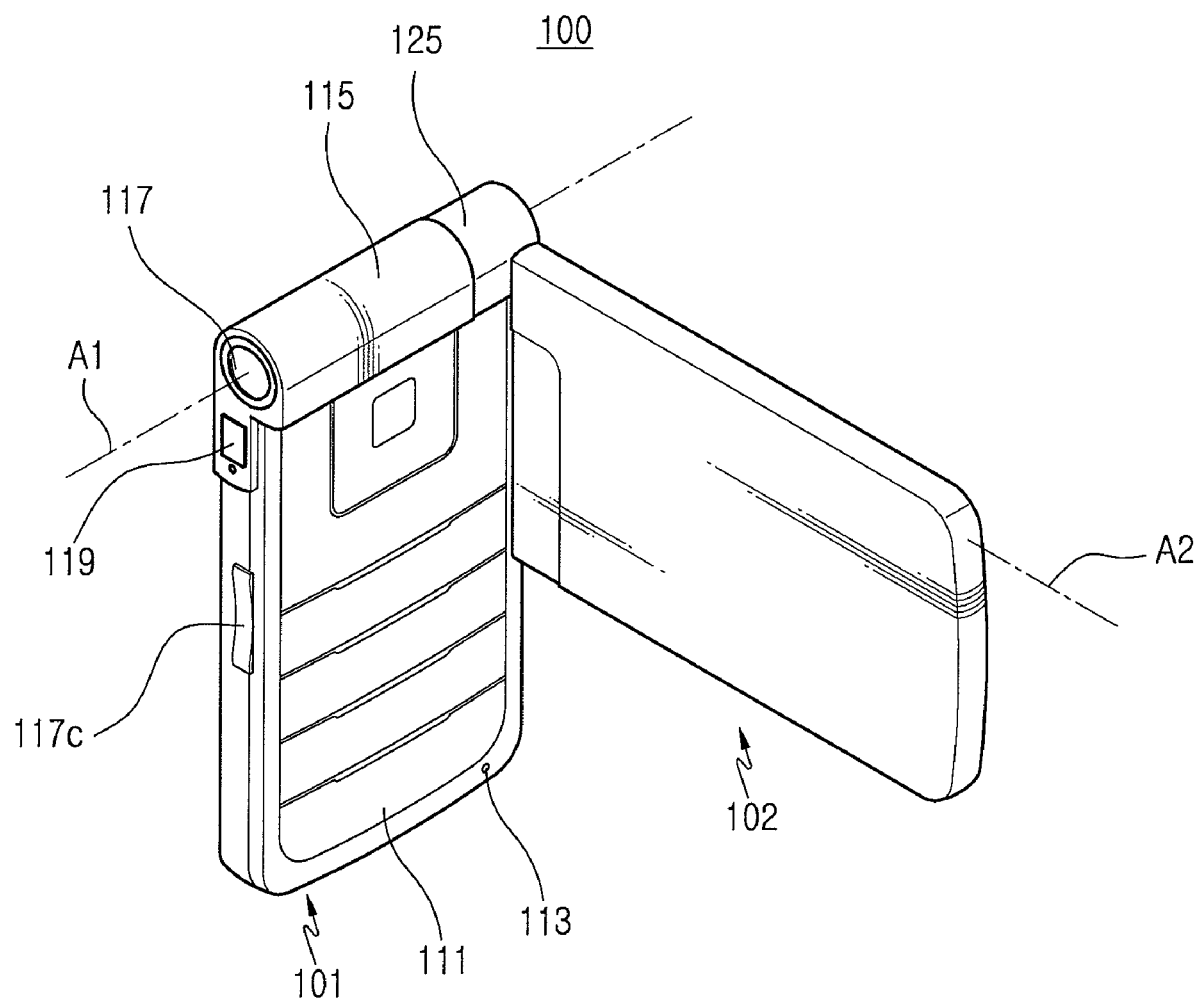
FIG. 5 is a perspective view illustrating a portable terminal of FIG. 4 shown from another direction.

FIGS. 4 and 5 illustrate another unfolded state in which the second housing 102 has rotated about the first hinge axis A1 so as to be unfolded at angle of approximately 90° with respect to the first housing 101 and then has rotated about the second hinge axis A2 such that the inner face of the second housing is oriented in a same direction as a first side of the portable terminal 100. At this time, a screen display direction of the display device 121 faces a same direction in which a first side of the portable terminal 100 faces. In addition, the camera lens 117, which is arranged on the second side face of the first housing 101, photographs toward the second side direction.

That is, the photographing direction of the camera lens and the screen display direction are along the first hinge axis A1 direction but are opposite to each other. At this time, the user can make the display device 121 display an image toward the first side direction of the portable terminal, and then can take a photograph of a subject while comparing an actual appearance of the subject with an appearance of the subject to be photographed through the display device 121. Further, since the zoom button 117a and the shutter switch 117b are disposed on the first side face of the first housing 101, the user can easily manipulate the zoom button 117a and shutter switch 117b with their thumb, etc.

Figure 6:
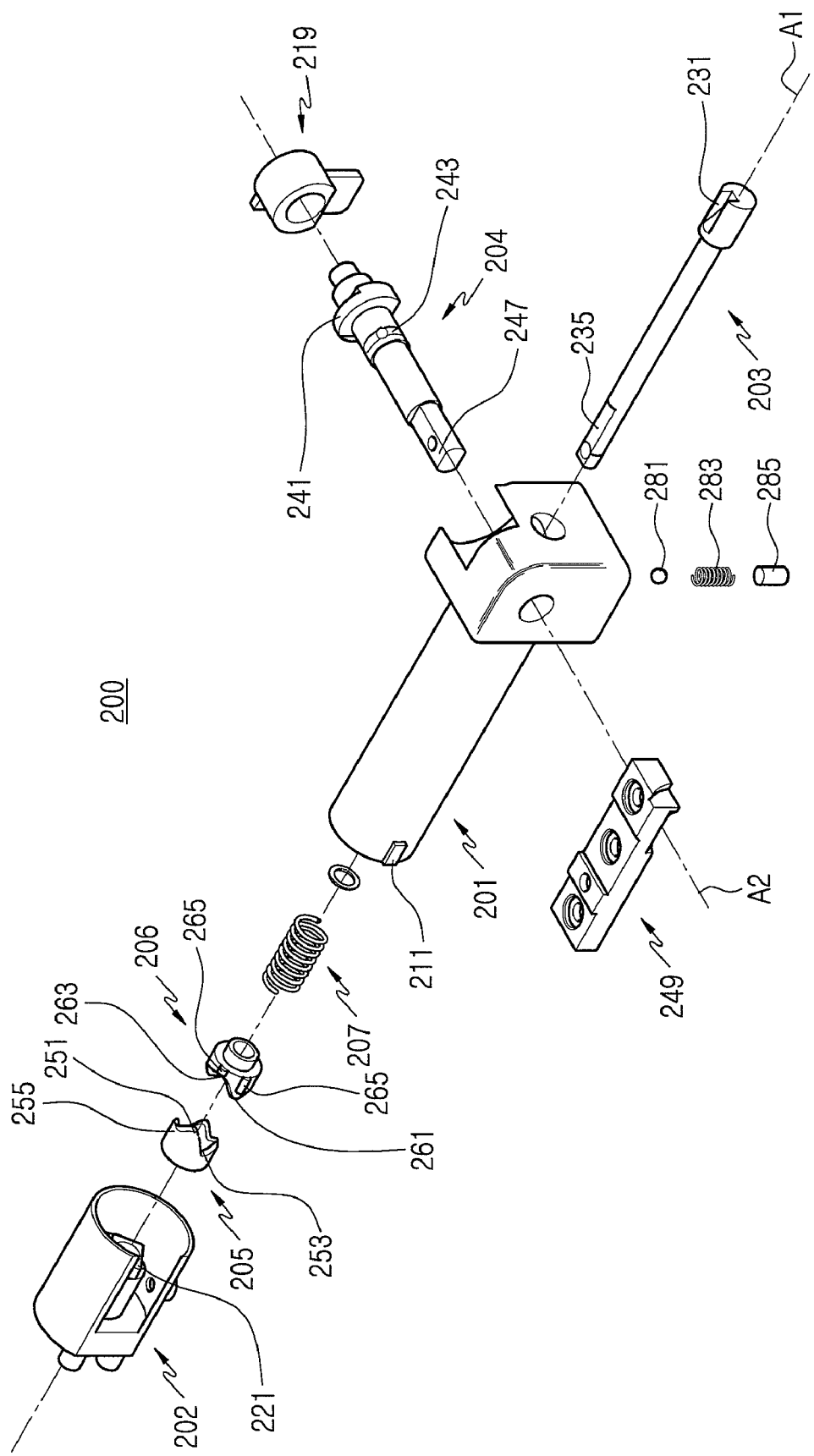
FIG. 6 is an exploded perspective view illustrating a hinge apparatus of a portable terminal shown in FIG. 1.

FIG. 6 is an exploded view illustrating the hinge apparatus 200 which pivotally couples the first housing 101 and the second housing 102 to each other. The hinge apparatus 200 is disposed within the first hinge arm 115 and passes through the second hinge arm 125 and is coupled to the second housing 102.

The hinge apparatus 200 includes a first hinge shaft 203 coupled to the first housing 101 along the first hinge axis A1 and a second hinge shaft 204 coupled to the second housing 102 along the second hinge axis A2. The second hinge shaft 204 together with the second housing 102 can rotate about the first hinge axis A1 and about the second hinge axis A2, as well.

That is, when the second hinge shaft 204 rotates about the first hinge axis A1, the second housing 102 rotates about the first hinge axis A1. Also, when the second hinge shaft 204 rotates about the second hinge axis A2, the second housing 102 rotates about the second hinge axis A2.

In addition, in order to achieve a single module including the first and second hinge shafts 203 and 204, the hinge apparatus 200 may include a hinge housing 201 and a supporter 202. Also, the hinge apparatus 200 may include a first hinge cam 205, a second hinge cam 206, an elastic member 207, a ball assembly in order to provide a driving force rotating the second housing 102 and a friction force stabilizing stop states of the second housing 102.

The hinge housing 201 extends along the first hinge axis A1 and is disposed within the first hinge arm 115, so the hinge housing 201 together with the second hinge arm 125 can rotate about the first hinge axis A1. The hinge housing 201 may be formed as an integral structure together with the first hinge arm 115 or into a separate unit. In the drawings, the hinge housing 201 has a separate structure in consideration of the assembling of the first and second hinge shaft 203 and 204 and an appearance of the portable terminal 100.

The hinge housing 201 sequentially receives the elastic member 207, the second hinge cam 206 and the first hinge cam 205 therewithin. The first hinge shaft 203 extends sequentially through the elastic member 207, the second hinge cam 206 and the first hinge cam 205, and is fixed, at a first end thereof, to the supporter 202.

The supporter 202 is secured within the first hinge arm 115 and rotatably receives a first end of the hinge housing 201. At this time, since the first end of the first hinge shaft 203 is secured in the supporter 202 while a second end of the first hinge shaft 203 supports the hinge housing 201, the hinge housing 201 is rotatably held on the supporter 202. In other words, the hinge housing 201 is supported by the first hinge shaft 203 and rotates about the first hinge axis A1 together with the second housing 102. At this time, the hinge housing 201 has the first end fixed within the second hinge arm 125, extends along the first hinge axis A1, and has the second end fixed to the supporter 202.

Figure 7:
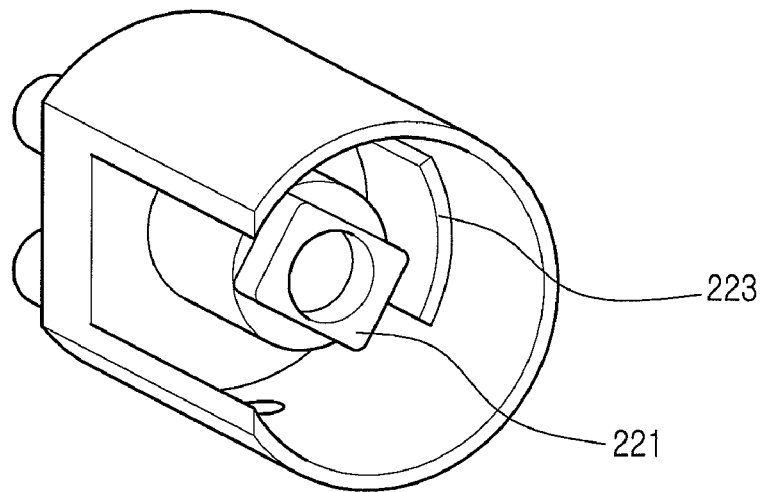
FIG. 7 is a perspective view illustrating a supporter of a hinge apparatus shown in FIG. 6.

Referring further to FIG. 7, the supporter 202 has a second stopper rib 223 formed therewithin and the hinge housing 201 has a stopper protrusion 211 formed at a circumferential surface of the first end portion thereof, thereby defining the rotation range of the second housing 102. In more detail, when the second housing 102 rotates about the first hinge axis A1 to be unfolded, the second stopper rib 223 interferes with the stopper protrusion 211, thereby stopping the second housing 102 at a predetermined position. An angle that the second housing 102 is unfolded by rotating about the first hinge axis A1 can be configured into an angle of, for example, approximately 165° similar to a common folder-type portable terminal. The angle that the second housing 102 is unfolded by rotating about the first hinge axis A1 can be variously modified by varying the positions of the second stopper rib 223 and the stopper protrusion 211.

Figure 8:
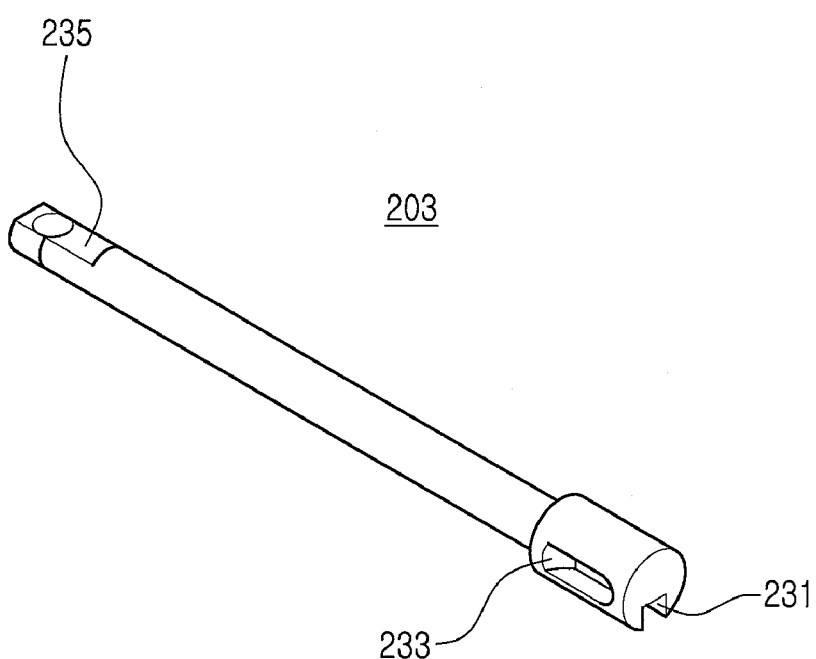
FIG. 8 is a perspective view illustrating a first hinge shaft of a hinge apparatus shown in FIG. 6.

Referring to FIG. 8, the first hinge shaft 203 has a first stopper slot 231 formed at a circumferential surface of a second end portion thereof, which extends along the first hinge axis A1. The first hinge shaft 203 also has a second stopper slot 233 spaced from the first stopper slot 231 along a circumference thereof. The second stopper slot 233 extends along the first hinge axis A1 and is spaced from the first stopper slot 231 at a distance, which corresponds to an angle of approximately 90° relative to the first stopper slot 231.

When the second housing 102 rotates about the second hinge axis A2 to be away from the first housing 101, the first stopper slot 231 is engaged with a first stopper rib 241 of the second hinge shaft 204, thereby restricting the second housing 102 from rotating about the first hinge axis A1. In addition, when the display device 121 is oriented in a same direction in which a first side of the portable terminal 100 faces, the first stopper rib 241 is engaged with the second stopper slot 233, thereby preventing the second housing 102 from rotating about the first hinge axis A1.

Meanwhile, the first hinge shaft 203 has a flat portion 235 formed at an outer circumferential surface of the first end portion thereof. The flat portion 235 allows the first hinge shaft 203 to be fixed to the supporter 202 and prevents the first hinge shaft 203 from rotating about the first hinge axis A1 as well.

The first and second hinge cams 205 and 206 and the elastic member 207 are components for providing driving forces to the second housing 102 when rotating about the first hinge axis A1.

The first hinge cam 205 is fixed to a fixing protrusion 221 and has, on its one face, a pair of first mountain-shaped protrusions 251 and first valley-shaped portions 253 which are alternatively formed with each other along a circumference of the first hinge cam 205. In addition, each of the first mountain-shaped protrusions 251 has a first stopper recess 255 on a surface thereof, which are located symmetrically to each other relative to the first hinge axis A1.

The second hinge cam 206 is disposed within the hinge housing 201 so as to be only linearly movable under guidance of guide protrusions 265 formed on a circumferential surface thereof. The elastic member 207 is received within the hinge housing 201 and provides an elastic force to cause the second hinge cam 206 to contact and push the first hinge cam 205. Therefore, when the hinge housing 201 rotates, the second hinge cam 206 rotates about the first hinge axis A1 together with the hinge housing 201 while rubbing against the first hinge cam 205.

Also, the second hinge cam 206 has a pair of second mountain-shaped protrusions 261 and second valley-shaped portions 263, in which the second mountain-shaped protrusions 261 and the second valley-shaped portions 263 are alternatively formed with each other along a circumstance of the second hinge cam 206. Therefore, in the state that the second hinge cam 206 is in contact with and pushes the first hinge cam 205 due to the elastic force of the elastic member 207, once the second hinge cam 206 starts to move along the rotation direction thereof, the second hinge cam 206 rotates in an engaging direction of the second mountain-shaped protrusions 261 and the first valley-shaped portions 253. That is, the elastic force of the elastic member 207 acts as a driving force for the rotation of the second hinge cam 206, and ultimately, the rotation of the hinge housing 201 and the second housing 102.

Figure 13:
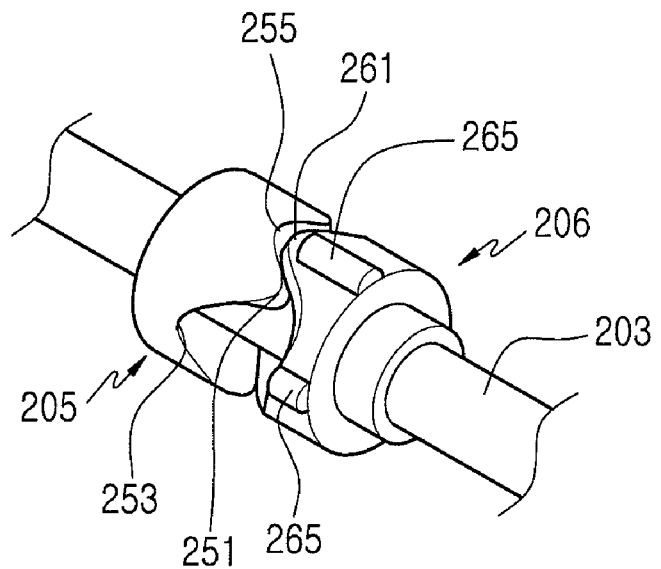
FIG. 13 is a perspective view illustrating hinge cams in a state which corresponds to an unfolded state of a portable terminal shown in FIG. 4.
Figure 14:
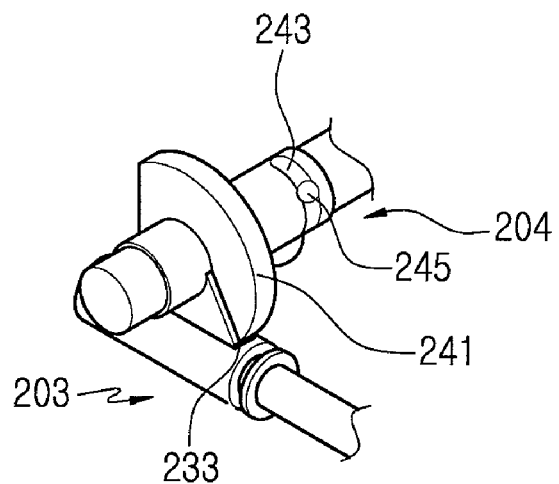
FIG. 14 is a perspective view illustrating a first hinge shaft and a second hinge shaft in a state that corresponds to an unfolded state of a portable terminal shown in FIG. 4.

At this time, when the second housing 102 rotates about the first hinge axis A1 to be unfolded at the angle of approximately 90° with respect to the first housing 101, the second mountain-shaped protrusions 261 come into engagement with the first stopper recesses 255. Thus, in the unfolded state in which the second housing 102 is unfolded at the angle of approximately 90° with respect to the first housing 101, the second housing 102 can maintain a stable stop state and can rotate about the second hinge axis A2 from the stop state. FIG. 13 illustrates hinge cams in a state in which the second mountain-shaped protrusions 261 are engaged with the first stopper recesses 255 when the second housing 102 has rotated about the first hinge axis A1 to be unfolded at the angle of 90° with respect to the first housing 101. FIG. 14 shows the second hinge shaft 204 and the first hinge shaft 203 in a state in which the first stopper rib 241 is engaged with the second stopper slot 233 when the second housing 102 has rotated about the second hinge axis A2 from the unfolded state at the angle of approximately 90° with respect to the first housing 101.

Accordingly, a combination of the first hinge cam 205, the second hinge cam 206 and the elastic member 207 provides a driving force for the rotation of the second housing 102 while rotating about the first hinge axis A1 and maintains the stop state of the second housing 102 when unfolded at the angle of approximately 90° with respect to the first housing 101.

In addition, when the second housing 102 rotates further, and therefore, the second mountain-shaped protrusions 261 escape from the state of engagement with the first stopper recesses 255, the second hinge cam 206 begins rotating in a direction in which the second mountain-shaped protrusions 261 come into the engagement with the first valley-shaped portions 253. Here, the generated driving force acts in a direction in which the second housing 102 is moved away from the first housing 101.

Figure 9:
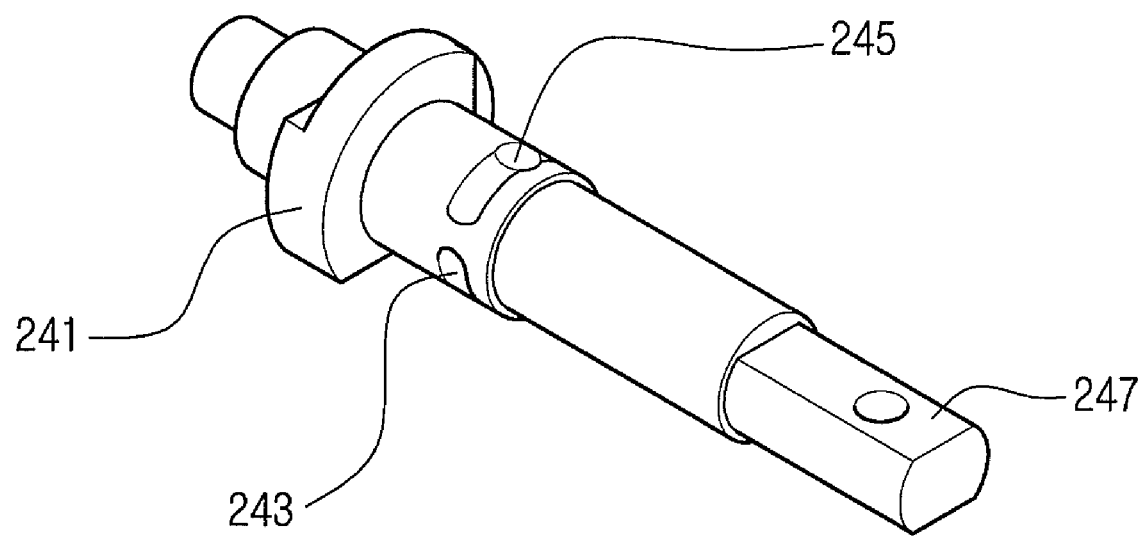
FIG. 9 is a perspective view illustrating a second hinge shaft of a hinge apparatus shown in FIG. 6.

FIG. 9 illustrates the second hinge shaft 204. Referring to FIGS. 6 and 9, the second hinge shaft 204 is coupled with the hinge housing 201 in such a manner that the second hinge shaft 204 is inserted through the hinge housing 201 from a first side of the hinge housing 201 to a second side of the hinge housing 201 and has the first stopper rib 241 located within the hinge housing 201. In addition, the hinge housing 201 mounts a hinge cap 219, thereby rotatably holding the first stopper rib 241 therewithin. As a result, the second hinge shaft 204 can rotate about the second hinge axis A2, but is prevented from moving along the second hinge axis A2.

The first stopper rib 241 has a flat portion with a shape of a cutaway plane at an outer circumferential surface thereof, which moves in contact with the outer circumferential surface of the first hinge shaft 203 while the second housing 102 is rotating about the first hinge axis A1. Thus, when the flat portion of the first stopper rib 241 loses contact with the first and second stopper slots 231 and 233, the first stopper rib 241 interferes with the outer circumferential surface of the first hinge shaft 203, thereby preventing the second housing 102 from rotating about the second hinge axis A2. Accordingly, the second housing 102 can rotate about the second hinge axis A2 only when the first stopper rib 241 has been located at positions where the first stopper rib 241 can come into the engagement with the first stopper slot 231 or the second stopper slot 233, that is, when the second housing 102 has been folded on the first housing 101 or has rotated about the first hinge axis A1 to be unfolded at the angle of approximately 90° with respect to the first housing 101.

In addition, when the first stopper rib 241 is being engaged with the first stopper slot 231 or the second stopper slot 233, the second housing 102 cannot rotate about the first hinge axis A1. That is, when the second housing 102 has rotated about the second hinge axis A2 from the unfolded state on the first housing 101, the second housing 102 can rotate only about the second hinge axis A2. Further, when the second housing 102 has rotated about the second hinge axis A1 to be unfolded at the angle of approximately 90°, and then has rotated about the second hinge axis A2, the second housing 102 can rotate only about the second hinge axis A2.

The second hinge shaft 204 has a coupling piece 249 at the second end portion thereof. The coupling piece 249 is a member for fixing the second hinge shaft 204 to the second housing 102. The coupling piece 249 has a plurality of holes formed therein and the coupling piece 249 may be affixed with screws. In order to mount the coupling piece 249, the second hinge shaft 204 may have a flat portion 247 formed at an outer circumferential surface of the second end portion thereof.

The second hinge shaft 204 has, on the outer circumferential surface of the first end portion thereof, a guide groove 243 adjacent to the first stopper rib 241. The guide groove 243 extends along the circumference of the second hinge shaft 204, and is in sliding contact with a part of the ball assembly while the second hinge shaft 204 is rotating. Further, the guide groove 243 has second stopper recesses 245 which are formed at predetermined positions therein. Thus, the second stopper recesses 245 are selectively engaged with a part of the ball assembly, thereby stopping the rotation of the second housing 102 or maintaining the stop state of the second housing 102.

Figure 2:
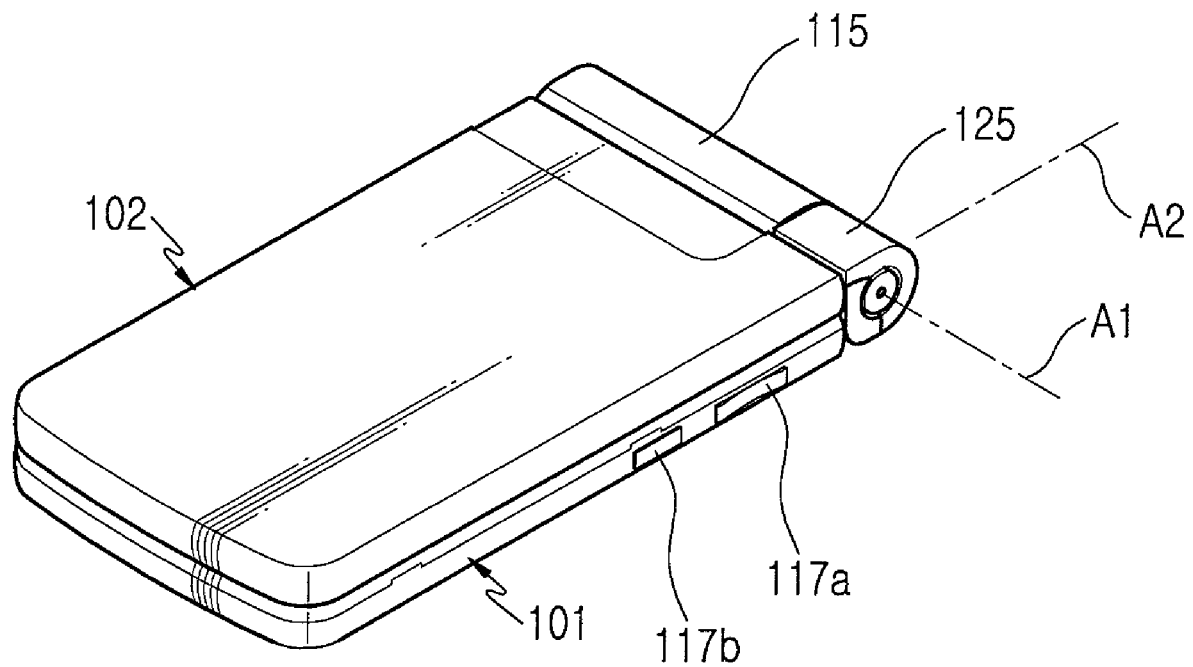
FIG. 2 is a perspective view illustrating a portable terminal of FIG. 1 in a folded state, in which housings of the portable terminal are folded each other.

A part of the ball assembly is engaged with one of the second stopper recesses 245 when the second housing 102 has been folded on the first housing 101 and when the second housing 102 has rotated to be unfolded at an angle of approximately 150° with respect to the first housing 101. That is, as illustrated in FIGS. 2 and 3, when the portable terminal has been either closed or opened at the angle of approximately 150°, the ball assembly is engaged with one of the second stopper recesses 245. Here, the second housing 102 can be set to be unfolded at various angles through rotation about the second hinge axis A2, so the positions of second stopper recesses 245 should be determined based on the unfolded angles of the second housing 102.

Further, a part of the ball assembly is in sliding contact with the guide groove 243 and therefore provides a frictional force, thereby stabilizing the rotation of the second housing 102.

Referring to FIG. 6, the ball assembly includes a metal ball 281, a spring 283, and a screw 285. The metal ball 281 is in sliding contact with the guide groove 243, and is then selectively engaged with one of the second stopper recesses 245. Here, the metal ball 281 provides the frictional force, which causes the ball 281 to contact and push the outer circumferential surface of the second hinge shaft 204. The screw 285 is fastened to the hinge housing 201 so as to support the spring 283.

Hereinafter, the operation of the hinge apparatus 200 depending on the rotation of the second housing 102 will be explained with reference to FIGS. 10 to 14.

Figure 10:
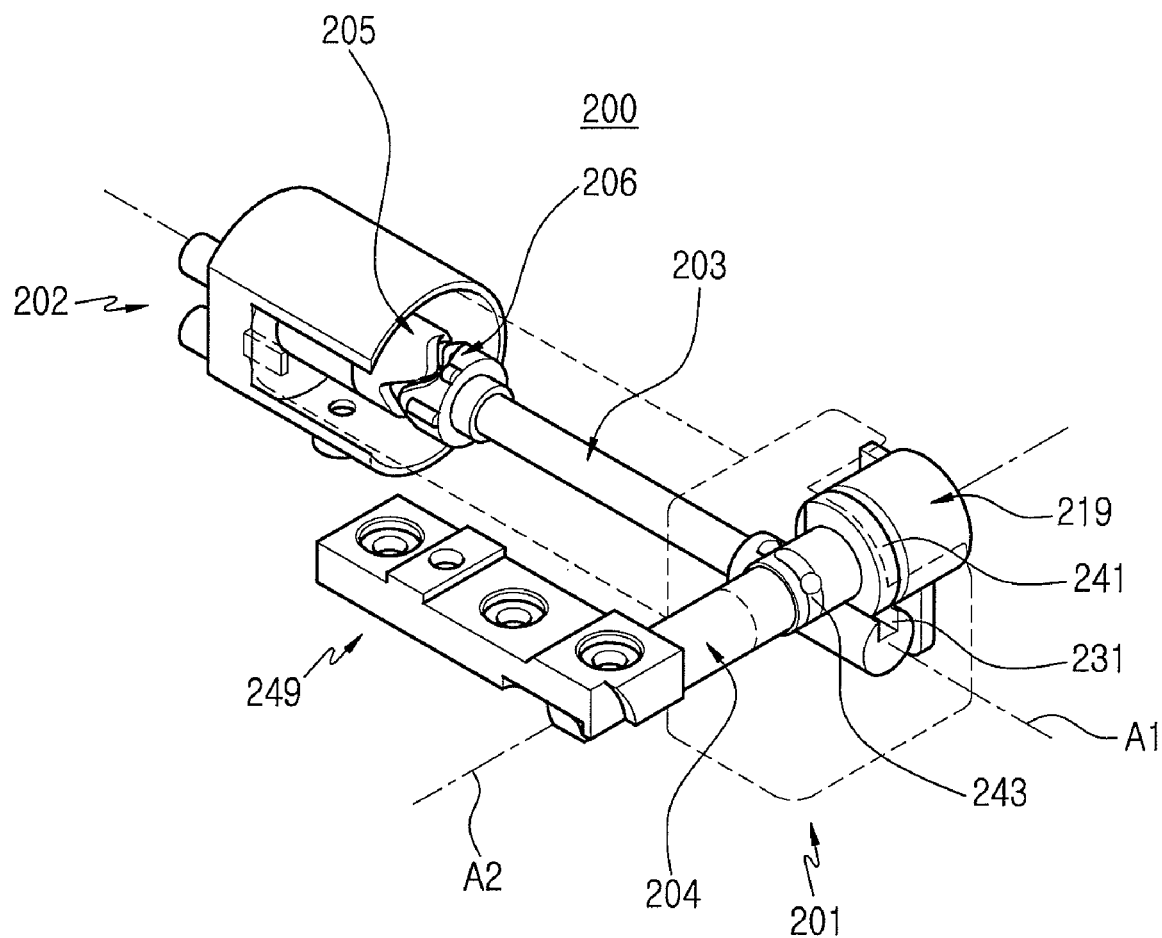
FIG. 10 is an assembled perspective view illustrating a hinge apparatus of FIG. 6.

FIG. 10 illustrates the hinge apparatus 200 in a state corresponding to FIG. 2, in which the first housing 101 and the second housing 102 has been folded together. When the first housing 101 and the second housing 102 are folded together, the flat portion of the first stopper rib 241 comes into contact with the first stopper slot 231. Thus, the second housing 102 can selectively rotate about either the first hinge axis A1 or the second hinge axis A2 at this time. Although FIG. 10 shows the first hinge cam 205 and the second hinge cam 206 spaced from each other in order to more clearly illustrate a positional relationship between them, it can be easily understood by one skilled in the art that the second mountain-shaped protrusions 261 are being engaged with the first valley-shaped portions 253 by the elastic force of the elastic member 207.

At this time, the ball 281 keeps engaging with one of the second stopper recesses 245, and thus restricts the second housing 102 from rotating about the second hinge axis A2. Furthermore, during the rotation of the second housing 102 from the folded state on the first housing 101 to an unfolded position, it is impossible that the second housing 102 rotates about the second hinge axis A2 because the first stopper rib 241 interferes with the outer circumferential surface of the first hinge shaft 203. But, when the user rotates the second housing 102 about the second hinge axis A2 from the unfolded state on the first housing 101, the ball 281 escapes from the second stopper recesses 245 and then comes into in sliding contact with the outer circumferential surface of the second hinge shaft 204 along the guide groove 243.

Figure 11:
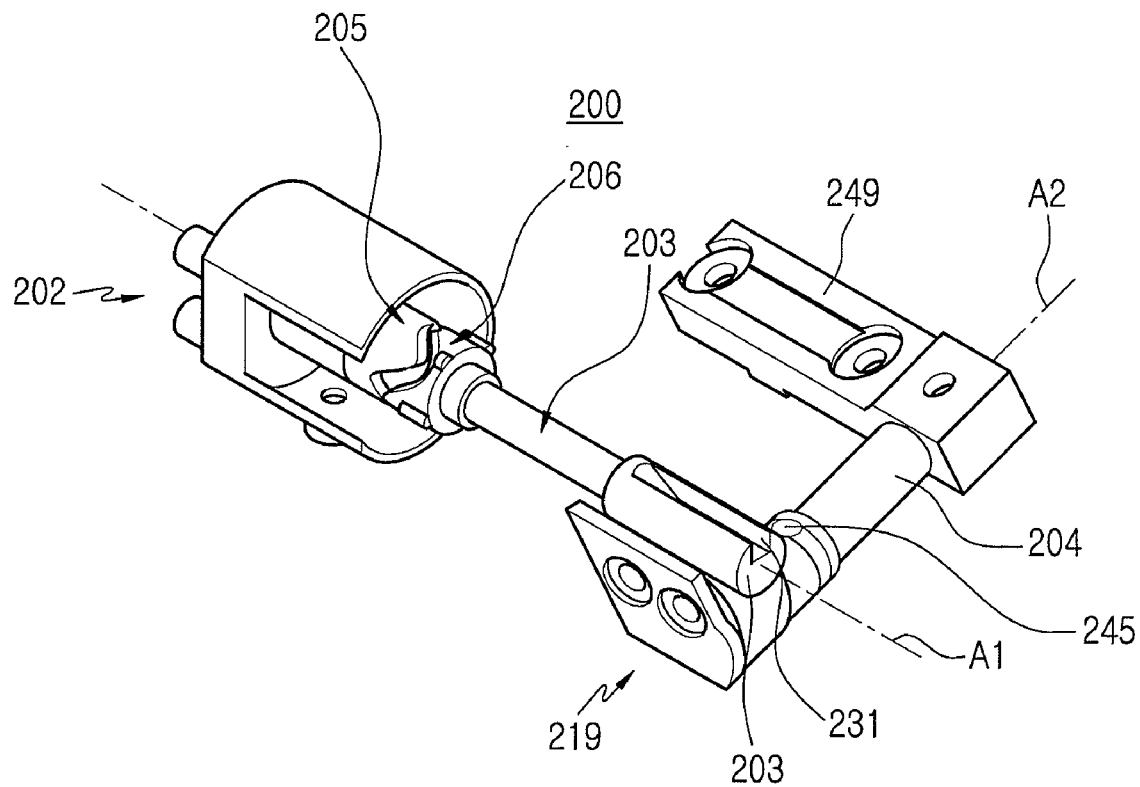
FIG. 11 is a perspective view illustrating a hinge apparatus in a state which corresponds to the unfolded state of a portable terminal shown in FIG. 1.

FIG. 11 illustrates the hinge apparatus 200 in a state corresponding to FIG. 1, in which the second housing 102 has been unfolded at an angle of approximately 165° with respect to the first housing 101 by rotating about the first hinge axis A1. In this case, as described above, the stopper protrusion 211 interferes with the second stopper rib 223, thereby stopping the second housing 102.

When the second housing 102 begins to rotate about the first hinge axis A1 and then is gradually unfolded from the folded state on the first housing 101, the second hinge cam 206 rotates together with the second housing 102 and then the second mountain-shaped protrusions 261 move gradually away from the first valley-shaped portions 253. Thus, the second hinge cam 206 is gradually retracted within the hinge housing 201, and therefore, the elastic force accumulated in the elastic member 207 is increased.

At this time, the elastic force of the elastic member 207 is converted into a driving force rotating the second hinge cam 206 in a direction in which the second mountain-shaped protrusions 261 come into engagement with the first valley-shaped portions 253. That is, a combination including the first hinge cam 205, the second hinge cam 206 and the elastic member 207 provides the driving force acting in a direction in which the second housing 102 is folded on the first housing 101 when the second housing 102 rotates about the first hinge axis A1 to be unfolded from the folded state on the first housing 101.

When the second housing 102 is rotated further so as to be unfolded at the angle of approximately 90°, the second mountain-shaped protrusions 261 are engaged with the first stopper recesses 255. In this state, the second housing 102 can rotate about the second hinge axis A2, and it will be explained later.

When the second housing 102 is further rotated about the first hinge axis A1 and the second mountain-shaped protrusions 261 escape from the first stopper recesses 255, the second hinge cam 206 rotates in a direction in which the second mountain-shaped protrusions 261 come into engagement with the first valley-shaped portions 253. A driving force generated at this time acts in a direction in which the second housing 102 moves away from the first housing 101.

That is, the driving force, which is generated by the first hinge cam 205, the second hinge cam 206, and the elastic member 207 before the second mountain-shaped protrusions 261 is engaged with the first stopper recesses 255 from the state in which the second housing 102 is folded on the first housing 101, rotates the second housing 102 in the direction for folding the second housing 102 onto the first housing 101. Then, the driving force, which is generated between the location at which the second mountain-shaped protrusions 261 is disengaged from the first stopper recesses 255 and the location at which the second housing is unfolded at approximately 165°, rotates the second housing 102 in a direction away from the first housing 101.

When the second housing 102 has rotated about the first hinge axis A1 and then has been unfolded at the angle of approximately 165°, the user can conveniently use the portable terminal 100 for a common mobile communication service or playing simple games.

Meanwhile, the metal ball 281 continues engaging with the second stopper recesses 245 while the second housing 102 is rotating about the first hinge axis A1 and therefore prevents the second housing 102 from moving about the second hinge axis A2. Also, since the flat portion of the first stopper rib 241 keeps in contact with the outer circumferential surface of the first hinge shaft 203 while the second housing 102 is rotating about the first hinge axis A1, the second housing 102 cannot rotate about the second hinge axis A2. However, when the second housing 102 has been unfolded at the angle of 90° with respect to the first housing 101 through rotation about the first hinge axis A1, the first stopper rib 241 can enter into the second stopper slot 233 and the second housing 102 can thus rotate about the second hinge axis A2.

Figure 12:
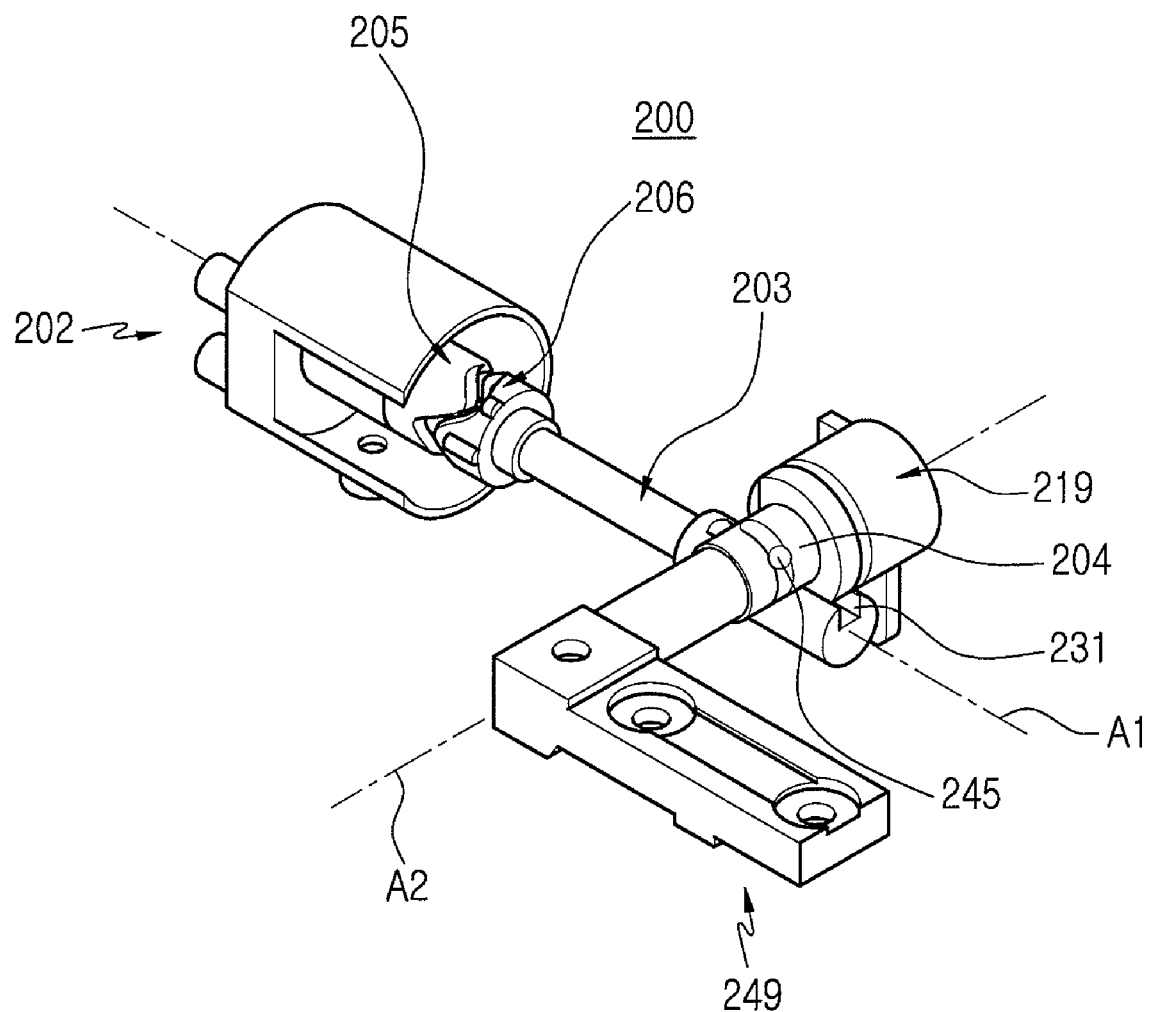
FIG. 12 is a perspective view illustrating a hinge apparatus in a state that corresponds to the unfolded state a portable terminal shown in FIG. 3.

FIG. 12 illustrates the hinge apparatus 200 in a state corresponding to FIG. 3 in which the second housing 102 has rotated about the second hinge axis A2 and then has been unfolded from the folded state on the first housing 101. When the second housing 102 begins to rotate about the second hinge axis A2 and then is gradually unfolded, the first stopper rib 241 enters into the first stopper slot 231. Therefore, the second housing 102 cannot rotate about the first hinge axis A1.

While the second housing 102 is rotating about the second hinge axis A2 to be unfolded, the ball 281 is in sliding contact with the guide groove 243. When the second housing 102 is unfolded at the angle of approximately 150° with respect to the first housing 101, the ball 281 comes into engagement with one of the second stopper recesses 245, thereby stopping the rotation of the second housing 102 and then maintaining the stop state. If the second stopper recesses 245 includes a number of recesses, the angles, at which the second housing 102 can stop while rotating about the first hinge axis A1, can be variously configured, such as at approximately 90°, 120°, 150°, 170°, etc.

As illustrated in FIG. 13, when the second housing 102 has rotated about the first hinge axis A1 and then has been unfolded at the angle of approximately 90°, the second mountain-shaped protrusions 261 are engaged the first stopper recesses 255. At this time, the flat portion of the first stopper rib 241 faces the second stopper slot 233, so that the first stopper rib 241 is located at a position to allow it to enter into the second stopper slot 233. Therefore, the user rotates the second housing 102 about the first hinge axis A1 to be unfolded at the angle of approximately 90° with respect to the first housing 101, and then can rotate it about the second hinge axis A2.

When the second housing 102 has rotated about the first hinge axis A1 to be unfolded at the angle of approximately 90° with respect to the second housing 102 and then has rotated about the second hinge axis A2, its inner face is oriented in a same direction in which a first side of the portable terminal 100 faces. That is, the screen display direction of the display device 121, together with the photographing direction of the lens, is along the first hinge axis A1, but both are opposite to each other. Thus, the user has the screen display direction of the display device 121 to be oriented opposite to the photographing direction of the camera lens 117 and then can take a photograph of a subject.

As described above, the portable terminal with the hinge apparatus according to exemplary embodiments of the present invention has an advantage that it is convenient for the user to use it for not only communication function but also for multimedia services such as watching a broadcast according to the open direction of the second hinge housing. In addition, another advantage is that, since the portable terminal with the hinge apparatus according to exemplary embodiments of the present invention is able to open in two directions, it provides improved convenience for use.

In addition, another advantage is that when the second housing has rotated about one of the first and second hinge axes, the second housing is restricted from rotating about the other hinge axis, thereby providing improved structural stability of the portable terminal.

In addition, another advantage is that when the second housing has rotated about the first hinge axis A1 to be unfolded at the angle of approximately 90°, the second housing can rotate about the second hinge axis A2, which allows the screen of the display device to be oriented in a same direction in which a first side of the portable terminal faces, and therefore, if the camera lens is installed at the second side face of the portable terminal, the user can conveniently take a photograph of a subject using the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising:
    a first housing;
    a second housing;
    a hinge apparatus coupling the first housing and the second housing together so that the second housing can be unfolded from and folded onto the first housing, the hinge apparatus including a first hinge axis and a second hinge axis perpendicular to the first hinge axis;
    a first hinge arm coupled to an upper end of the first housing; and
    a second hinge arm coupled to a first end of the first hinge arm, the second hinge arm rotating about the first hinge axis,
    wherein the hinge apparatus is disposed within the first hinge arm and is coupled to the second housing via the second hinge arm,
    wherein, from a folded state in which the second housing is folded onto the first housing, the second housing is operable to rotate about the first hinge axis to be located at an upper side of the first housing, is operable to rotate about the second hinge axis to be located at a first side of the first housing, and is operable to rotate about the first hinge axis to be unfolded at an angle of approximately 90° with respect to the first housing and then, with no intervening rotations, rotate about the second hinge axis so that an inner face of the second housing is oriented in a same direction in which the first side of the portable terminal faces, and
    wherein the second housing is operable to rotate about the first hinge axis together with the second hinge arm, and is operable to rotate about the second hinge axis relative to the second hinge arm.

2. The portable terminal as claimed in claim 1, wherein the first hinge axis is located on an upper end of the first housing and extends along a horizontal direction of the first housing, and the second hinge axis is located on one side end of the second housing and extends along a vertical direction of the second housing, the second hinge axis rotating about the first hinge axis while the second housing is rotating about the first hinge axis.

3. The portable terminal as claimed in claim 1, further comprising:
   a camera lens arranged on a second side face of the first housing; and
   a display device arranged on the inner face of the second housing,
   wherein when the inner face of the second housing is oriented in the same direction in which the first side of the portable terminal faces, a screen display direction of the display device and a photographing direction of the camera lens are along the first hinge axis but are opposite to each other.

4. The portable terminal as claimed in claim 3, further comprising a lighting device disposed adjacent to the camera lens.

5. The portable terminal as claimed in claim 3, further comprising a zoom button and a shutter switch, which are disposed on at least one of a first side face and the second side face of the first housing.

6. A portable terminal comprising:
   a first housing;
   a second housing;
   a hinge apparatus coupling the first housing and the second housing together so that the second housing can be unfolded from and folded onto the first housing, the hinge apparatus including a first hinge axis and a second hinge axis perpendicular to the first hinge axis;
   a first hinge shaft fixed to the first housing along the first hinge axis;
   a second hinge shaft fixed to the second hinge housing along the second hinge axis, the second hinge shaft being operable to rotate about the first hinge axis and being operable to rotate about the second hinge axis;
   a first stopper slot formed on an outer circumferential surface of the first hinge shaft along the first hinge axis;
   a second stopper slot formed on the outer circumferential surface of the first hinge shaft along the first hinge axis and parallel with the first stopper slot; and
   a first stopper rib formed on an outer circumferential surface of the second hinge shaft along a circumference of the second hinge shaft,
   wherein, from a folded state in which the second housing is folded onto the first housing, the second housing is operable to rotate about the first hinge axis to be located at an upper side of the first housing, is operable to rotate about the second hinge axis to be located at a first side of the first housing, and is operable to rotate about the first hinge axis to be unfolded at an angle of approximately 90° with respect to the first housing and then, with no intervening rotations, rotate about the second hinge axis so that an inner face of the second housing is oriented in a same direction in which the first side of the portable terminal faces,
   wherein when the second housing rotates about the first hinge axis to be unfolded, the first stopper rib interferes with the outer circumferential surface of the first hinge shaft, thereby restricting the second housing from rotating about the second hinge axis,
   wherein when the second housing rotates about the second hinge axis to be unfolded, the first stopper rib is engaged with the first stopper slot, thereby restricting the second housing from rotating about the first hinge axis, and
   wherein when the second housing rotates about the first hinge axis to be unfolded at an angle of approximately 90° with respect to the first housing and then rotates about the second hinge axis, the first stopper rib is engaged with the second stopper slot, thereby restricting the second housing from rotating about the first hinge axis.

7. The portable terminal as claimed in claim 6, wherein the hinge apparatus further comprises a hinge housing rotatably coupled with the first hinge shaft, the hinge housing extending along the first hinge axis,
   wherein the second hinge shaft is rotatably coupled with the hinge housing along the second hinge axis.

8. The portable terminal as claimed in claim 7, wherein the hinge apparatus further comprises a supporter fixed to the first housing,
   wherein the first hinge shaft is fixed to the supporter, and a first end of the hinge housing is rotatably received in the supporter.

9. The portable terminal as claimed in claim 8, wherein the hinge apparatus further comprises:
   a second stopper rib formed within the supporter; and
   a stopper protrusion formed at an outer circumferential surface of a first end portion of the hinge housing,
   wherein the stopper protrusion interferes with the second stopper rib, thereby defining a rotation angle range of the hinge housing as an angle of approximately 165° or less.

10. The portable terminal as claimed in claim 8, wherein the hinge apparatus further comprises:
    a first hinge cam fixed to the supporter;
    a second hinge cam accommodated in the hinge housing, the second hinge cam being linearly movable within the hinge housing; and
    an elastic member accommodated in the hinge housing, the elastic member providing an elastic force to cause the first hinge cam to contact and push the first hinge cam,
    wherein the second hinge cam is in sliding contact with the first hinge cam while the hinge housing is rotating.

11. The portable terminal as claimed in claim 10, wherein the hinge apparatus further comprises:
    a plurality of first mountain-shaped protrusions and a plurality of first valley-shaped portions which are formed at one end of the first hinge cam, the plurality of first mountain-shaped protrusions and the plurality of first valley-shaped portions being alternatively disposed along a circumference of the first hinge cam; and
    a plurality of second mountain-shaped protrusions and a plurality of second valley-shaped portions which are formed on the second hinge cam, the plurality of second mountain-shaped protrusions and the plurality of second valley-shaped portions corresponding to the plurality of first mountain-shaped protrusions and the plurality of first valley-shaped portions,
    wherein a rotatory power is generated when the hinge housing rotates, the rotatory power acting in a direction in which the plurality of second mountain-shaped protrusions come into engagement with the plurality of first valley-shaped portions.

12. The portable terminal as claimed in claim 11, wherein the hinge apparatus further comprises first stopper recesses, each of the first stopper recesses formed on a surface of each of the plurality of first mountain-shaped protrusions,
    wherein each of the plurality of second mountain-shaped protrusions is respectively engaged with each of the plurality of first stopper recesses when the second housing rotates about the first hinge axis to be unfolded at the angle of approximately 90° with respect to the first housing.

13. The portable terminal as claimed in claim 6, wherein the hinge apparatus further comprises a hinge housing extending along the first hinge axis, the hinge housing being rotatably assembled to the first hinge shaft,
wherein the second hinge shaft is assembled to the hinge housing so that the second hinge shaft extends through the hinge housing from a first side to a second side of the hinge housing, and the stopper rib is positioned within the hinge housing.

14. The portable terminal as claimed in claim 13, wherein the hinge apparatus further comprises a hinge cap coupled to the hinge housing at the first side of the hinge housing so as to rotatably hold the first stopper rib.

15. The portable terminal as claimed in claim 13, wherein the hinge apparatus further comprises a ball assembly disposed within the hinge housing,
wherein the ball assembly is in sliding contact with the second hinge shaft.

16. The portable terminal as claimed in claim 15, wherein the hinge apparatus further comprises a guide groove formed on the outer circumferential surface of the second hinge shaft,
wherein a part of the ball assembly is in sliding contact with the guide groove.

17. The portable terminal as claimed in claim 16, wherein the hinge apparatus further comprises at least one second stopper recess formed in the guide groove,
wherein a part of the ball assembly is engaged with the second stopper recess, thereby either stopping the second housing from rotating about the second hinge axis or keeping the second housing in a stop state.

18. The portable terminal as claimed in claim 6, wherein the hinge apparatus further comprises a coupling piece mounted at one end of the second hinge shaft,
wherein the coupling piece is coupled to the second housing within the second housing.

19. The portable terminal as claimed in claim 3, further comprising a photographic mode selection switch disposed adjacent to the display device.

* * * * *